F. NIELSEN.
INFLATING VALVE.
APPLICATION FILED APR. 17, 1914.
1,313,553.
Patented Aug. 19, 1919.
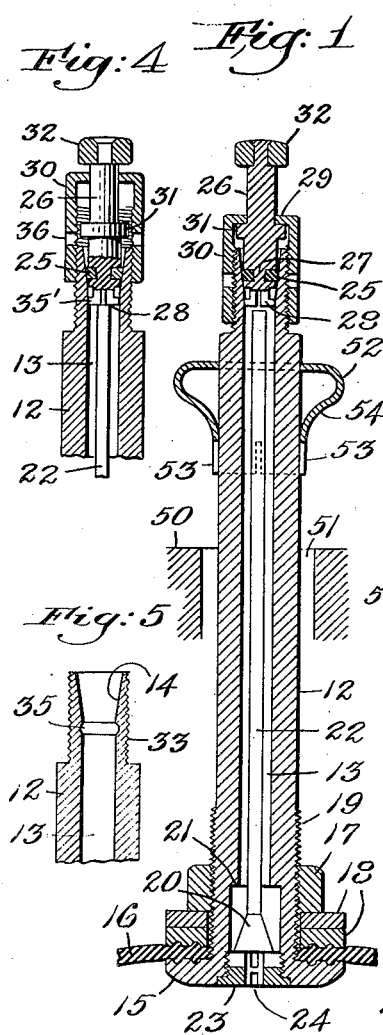
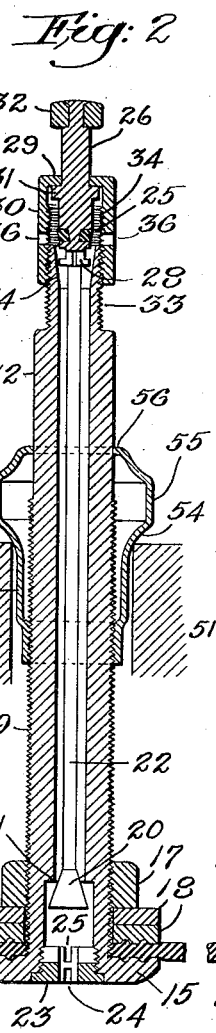
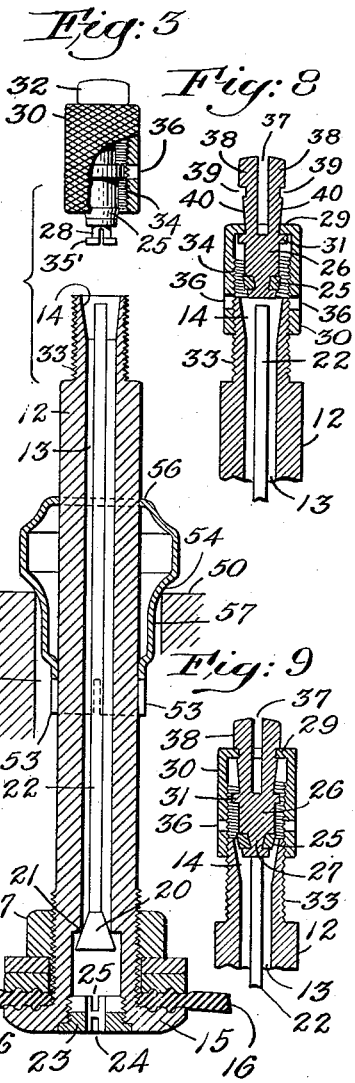
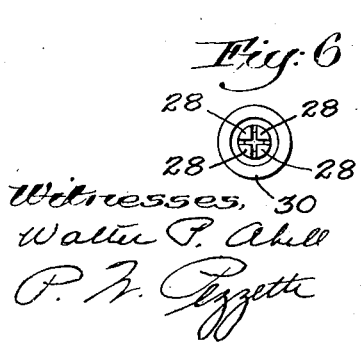
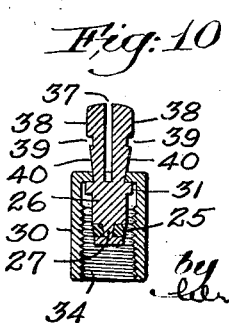
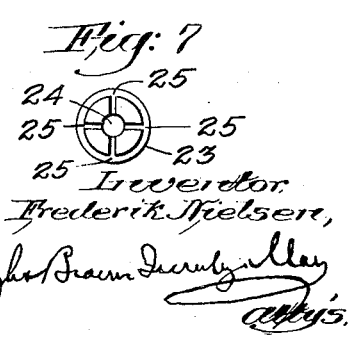
Witnesses,
Walter P. Ahl
P. N. Pezzetti
Inventor,
Frederik Nielsen,
by Hughes Braun Dunby May
Attys.

UNITED STATES PATENT OFFICE.

FREDERIK NIELSEN, OF BOSTON, MASSACHUSETTS, ASSIGNOR TO A. SCHRADER'S SON, INCORPORATED, OF BROOKLYN, NEW YORK, A CORPORATION OF NEW YORK.

INFLATING-VALVE.

1,313,553.     Specification of Letters Patent.     Patented Aug. 19, 1919.

Application filed April 17, 1914. Serial No. 832,502.

*To all whom it may concern:*

Be it known that I, FREDERIK NIELSEN, a subject of the King of Denmark, and resident of Boston, in the county of Suffolk and State of Massachusetts, have invented certain new and useful Improvements in Inflating-Valves, of which the following is a specification.

This invention relates to inflating valves and is illustrated by the accompanying drawings in a form specially adapted for pneumatic tires. The invention includes improvements upon the inflating valve which is illustrated, described and claimed in my copending application filed July 8, 1913, Serial No. 777,841.

Of the accompanying drawings:

Figure 1 represents a longitudinal section through the tire valve, the latter being closed.

Fig. 2 represents a similar section through the valve, the upper part of which is the same as that shown by Fig. 1 but adjusted for deflating, and the lower part of which is externally threaded throughout the greater portion of its length.

Fig. 3 represents a section showing the cap detached from the valve body, as for the purpose of inflating.

Fig. 4 represents a section of the upper portion of the device, the valve member of which is held upon its seat by resilient gripping means before the cap is screwed down.

Fig. 5 represents a section showing a modified form of the body member.

Fig. 6 represents an elevation of the lower end of the valve and cap included in Figs. 1 to 4 inclusive.

Fig. 7 represents a top plan view of the screw plug which is arranged in the lower end of the body member in Figs. 1, 2 and 3.

Fig. 8 represents a longitudinal section of another form of device in which the valve stem and cap have coöperative gripping means. In this figure the valve is in an intermediate position, as if in the course of being closed.

Fig. 9 represents a section of the structure shown by Fig. 8, showing the valve adjusted for deflating.

Fig. 10 represents a valve and cap which are similar to those shown in Figs. 8 and 9, excepting that the cap has no deflating ports in its side.

The same reference characters indicate the same parts wherever they occur.

The body of the device is indicated at 12 and is provided with an air passageway 13 and with a valve seat 14. A flange 15 is formed at one end of the body to engage the interior surface of the tire tube 16 or other pneumatic element. An air-tight joint between the body 12 and member 16 is effected by a nut 17 and washers 18, the nut being engaged with screw-threads 19 formed upon the body 12.

A check valve 20, preferably made of suitable soft material, such as rubber, is arranged in the body 12 to coact with a seat 21, its function being to prevent the loss of air excepting when it is desired to deflate the tire or other element 16. The check valve is provided with a stem 22, preferably metallic, which is of a sufficient length to be engaged, as hereinafter explained, to keep the check valve away from its seat. The check valve is confined in the body 12 by a screw plug 23 which as shown by Figs. 1, 2 and 3 is arranged in the lower end of the body 12. This plug has an air passageway 24 and grooves 25 communicating therewith to enable air to pass freely through the passageway 24 when the check valve is seated upon the plug, as shown by Fig. 1.

The valve which coacts with the seat 14 is indicated at 25 and is peferably composed of soft material, such as rubber. It is arranged upon a stem 26 which has a reduced neck 27. The neck is tapered in the same relation as the seat 14 in order to cause a tapering formation of the valve member 25, thus causing the shape of the valve member to conform to that of the valve seat. For the sake of economy the valve member may be cut from a cylindric tube of rubber, and when attached to the stem it is kept expanded by the larger end of the neck.

In the formation shown by Figs. 1 to 4 inclusive the valve stem is provided with means arranged to grip the body 12 to hold the valve upon its seat. For this purpose the lower end of the stem is slotted so as to form a plurality of resilient fingers or jaws 28. (See Fig. 6). When the stem is inserted into the mouth of the body 12 beyond the lower end of the valve seat, the jaws 28 bind upon the wall of the passageway 13 with sufficient force to hold the valve against movement due to air pressure.

The stem 26 extends through the crown 29 of a cap 30 and is provided with a flange 31 arranged to coact with the crown 29 to positively hold the valve in closed position, as will be understood after further description. The body 12 has an external screw-thread 33 and the cap has an internal screw-thread 34, whereby the cap may be detachably connected to the body. The valve stem is free to slide longitudinally through the crown of the cap, and its outer end is provided with a head 32 whereby the stem and cap are permanently connected. This form of device is intended to be operated as follows:—Assuming that the cap and the valve carried thereby have been removed for the purpose of inflating and that the inflating operation has been finished and it is desired to replace the valve 25, the cap may be screwed upon the body 12 only so far as to cause two or three convolutions of the connecting screw-threads to engage each other. This will carry the gripping jaws 28 into the mouth of the body 12, but the gripping jaws will engage the upper end of the stem 22 of the check valve (see Fig. 3), and the valve which is carried by the cap will be supported by the stem of the check valve, due to the internal air pressure which holds the check valve against its seat. When the threads of the cap have been engaged with those of the body 12 as last described, the head 32 may be manually depressed, thus causing the valve 25 to be quickly seated and the check valve to be unseated, the valve stem 26 by this operation being caused to slide through the crown 29. Before the valve 25 reaches its seat the spring jaws 28 are flexed toward each other by the smaller end of said seat, and they slide along the wall of the passageway 13. These jaws grip the walls of the passageway with sufficient force to keep the valve 25 seated, notwithstanding internal air pressure tending to blow the valve from its seat. Nothing remains to be done now excepting to screw the cap 30 upon the body 12 until the crown of the cap engages the flange 31 on the stem 26. When this has been done the parts are in the position shown by Fig. 1.

Fig. 5 illustrates a modified form of body member 12, the characteristic feature of which is an annular groove 35 formed in the air passageway 13. This groove is intended to receive the peripheral flanges 35' which are formed upon the spring jaws 28. The groove and flanges are so formed as to exert a downward pull upon the valve 25 in consequnce of the expanding stress of the spring jaws. This formation holds the valve 25 more firmly than the formation shown by Figs. 1 to 4, but I have found in practice that the formation shown by Figs. 1 to 4 holds the valve as tightly as necessary when the internal air pressure does not exceed 100 pounds to the square inch.

The spring jaws 28 serve another purpose which has not yet been described, and that is to prevent rotative movement of the stem 26 when the crown 29 of the cap is rotating upon the flange 31. If the rotative movement of the cap were transmitted to the stem 26 when the valve 25 is upon its seat, the valve member 25 would be abraded either by the valve stem or by the body 12. If the valve member should turn with the stem 26, the abrasion would be caused between the contacting surfaces of the valve member and valve seat; whereas, if the valve should remain stationary while the stem is turning, the abrading would occur at the contacting surfaces of the valve and stem. This cause of the wearing away of the valve member is wholly avoided by providing the spring jaws and using the device as hereinbefore explained.

For the purpose of effecting quick deflation, the cap 30 is provided with ports 36. In order to utilize these ports for deflating, the cap would be unscrewed to the position shown by Fig. 4, in which position the ports 36 are uncovered. The valve 25 may then be unseated by manually grasping the head 32 and exerting an upward pull sufficient to overcome the holding action of the spring jaws 28. When the cap is in the position last described it limits the upward movement of the valve stem 26 through the medium of the flange 31, so that the check valve 20 is prevented from reaching its seat. The valves as shown by Fig. 2 are in deflating position; that is to say, the check valve is held away from its seat by the cap, and the valve 25 is held away from its seat by the lifting action of the check valve, due to the internal air pressure. The air may thus pass through the passageway 13 and escape through the ports 36.

I have shown another modification in Figs. 8 and 9. In this form the valve stem 26 has gripping means arranged to coact with the screw cap instead of with the body 12, and said gripping means is arranged to hold the valves in deflating position. The upper end of the valve stem is formed with a slot 37, thereby providing two coöperative spring jaws 38. These jaws are provided with notches 39 arranged to receive the inner edge of the crown 29 as shown by Fig. 9. This device is not intended to be manipulated in precisely the same manner as the device shown by Figs. 1 to 4. Excepting as hereinbefore specified, the device shown by Figs. 8 and 9 is like the form first described. When attaching the cap shown by Figs. 8 and 9, the valve stem would be first adjusted to the position shown by Fig. 8; that is to say, the flange 31 would be set against the crown 29 and would remain in this position throughout the entire operation of screwing on the cap. In this form the deflating ports 36 are so disposed as to be covered by the inclosed end of the body 12 before the lower end of the stem 26 engages the stem 22 of the check valve. Fig. 8 shows the cap screwed on sufficiently to just cover the ports 36, but there is a space between the two valve stems which insures complete closing of the ports 36 before the check valve is depressed. The act of screwing the cap on as far as it will go seats the valve 25 and unseats the check valve.

In order to use this device for deflating, the cap would be unscrewed sufficiently to uncover the ports 36 (see Fig. 9), and the valve stem 26 would be depressed relatively to the cap. When the stem 26 is so depressed, the spring jaws 38 are flexed toward each other in consequence of a wedging action due to the tapering surfaces 40 which bear against the internal surface of the crown 29; and when the notches 39 register with the crown, the jaws 38 spring apart to the position shown by Fig. 9, thus locking the valves in deflating position. The members 38 may be manually flexed toward each other in order to unlock them from the crown of the cap, and if they are flexed sufficiently to cause them to touch each other they may be detached from the cap.

Although in Figs. 8 and 9 I have shown deflating ports 36, the device would afford sufficient means of escape for the air for the purpose of deflating if such ports were omitted. This is because the slot 37 is in communication with the hole through the crown of the cap, and, as may be readily understood by reference to Fig. 9, the air would pass through the slot 37 and through the crown of the cap. In Fig. 10 I have shown a cap and valve device which is in all respects like that shown in Figs. 8 and 9 excepting that the cap has no deflating port other than that in the crown.

Figs. 1, 2 and 3 illustrate various forms of means for centering the body 12 in the felly of a wheel. In each of these figures a portion of a felly is indicated at 50, and the hole through which the body 12 extends is indicated at 51. Fig. 1 includes a bushing 52 which is adapted to slide longitudinally upon the body 12 and which has spring jaws 53 arranged to grip the body 12. The exterior of the body is smooth and of cylindric form. The bushing 52 has a flaring portion 54 which is arranged to engage the rim of the hole 51 when the bushing is depressed as far as it will go. The gripping action of the jaws 53 is sufficient to hold the bushing in the desired position against the felly. The hole 51 is usually made substantially greater in diameter than the body 12 in order to permit the body to tip in the hole when attaching and detaching a tire. When the valve body is capable of tipping, the operation of attaching and detaching the tire is greatly facilitated. One objection to having a hole larger than the valve body is that it presents an unsightly appearance, and it has been the general practice to provide the valve body with means arranged to cover the hole. Such means is, in the majority of cases if not in every case, a nut threaded upon the body 12, it being generally though erroneously considered necessary to lock the valve body in the felly by means of a nut. I have found, however, that it is not necessary to so lock the valve body in the felly; and I have also found that when the thread upon the body 12 is extended for this purpose a great deal of time is wasted in screwing the nut 17 on and off. Fig. 2 illustrates a valve body upon which the external thread 19 is extended for the purpose of coacting with a felly-engaging nut 55. This nut has a reduced portion which enters the hole 51 in the felly and has a flaring portion 54 which is, to all intents and purposes, the equivalent of the flaring portion 54 shown in Fig. 1. When this device is attached, the thread upon the valve body is concealed by the exposed portion of the nut, a considerable portion of the length of the valve body being smooth and of a size to fit the flange 56 of the nut. The portion indicated at 57 takes up nearly all the clearance between the valve body and the valve and prevents rattling. The reduced portion which extends into the hole 51 takes up nearly all of the annular space between the valve body and the felly.

The bushing shown by Fig. 3 has spring tongues 53 which are, to all intents and purposes, similar to those shown in Fig. 1, the valve body for this bushing being smooth throughout the greater portion of its length. This bushing is similar to that shown by Fig. 2 in that it has a portion 57 of an intermediate diameter which occupies the hole 51 in the felly and minimizes the amount of clearance between the valve body and the felly.

Each bushing is capable of passing freely over the cap 30. The bushings shown by Figs. 1 and 3 may be moved to felly-engaging position by mere longitudinal movement and are held solely by the gripping action of the tongues 53. The bushing shown by Fig. 2, after being slipped over the cap 30, engages the thread 19 and thereafter must be rotated in order to be adjusted to felly-engaging position.

For the sake of rendering the structure reasonably clear, the figures are drawn to a scale larger than the devices which I have designed for use, and due allowance must be made for this fact in considering the possibilities of the structure. For example, it might be thought that the spring members 38 in Figs. 8 and 9 would be too stiff to be flexed toward each other by the fingers of the user; but when it is considered that in actual practice the fingers 38 would be substantially smaller, it can be readily understood that they would not be too stiff to permit such manipulation.

I claim:

1. An inflating valve comprising a body member having an air passageway and a valve seat, a cap member for the mouth of said body member, said cap member and body member having coactive connecting screw threads, and a valve carried by said cap and arranged to coact with said seat when said cap member is attached to said body member, said valve having a stem extending through the crown of said cap member and being movable relatively to said cap member toward and from said seat, and means carried by said stem independent of such threads for coacting with said body member to hold said valve on said seat.

2. An inflating valve comprising a body member having an air passageway and a valve seat, a cap member for the mouth of said body member, said body member and cap member having coactive connecting screw threads, and a valve carried by said cap member and arranged to be pressed against said valve seat by said cap member, said valve having a stem extending through the crown of said cap member and being movable toward and from said seat relatively to said cap member, said stem having resilient means arranged to coact with one of said members when said cap is in an intermediate position, to hold said valve in a closed position.

3. An inflating valve comprising a body member having an air passageway and a valve seat, a cap member for the mouth of said body member, said body member and cap member having coactive connecting screw threads, and a valve carried by said cap member and arranged to coact with said valve seat when said cap member is attached to said body member, said valve having a stem extending through the crown of said cap member and being movable toward and from said seat relatively to said cap member, said stem having resilient means arranged to coact with the internal surface of said body member to hold said valve in a predetermined position relatively to said seat.

4. An inflating valve comprising a body member having an air passageway and a valve seat, a cap member for the mouth of said body member, said cap member and body member having coactive connecting screw threads, a valve carried by said cap member and arranged to coact with said valve seat, said valve having a metallic stem arranged to slide through the crown of said cap member, said stem having coöperative resilient portions arranged to coact with one of said members to hold said valve closed.

5. In an inflating device, the combination with a member having an air passageway and a valve seat, of a valve and carrier therefor, said carrier having means arranged to grip the wall of said passageway to hold said valve upon said seat, and a cap for positively holding said valve on its seat.

6. In an inflating device, the combination with a member having an air passageway and a valve seat, of a valve and carrier therefor, said carrier having a plurality of spring members arranged to grip the wall of said passageway to hold said valve upon said seat, and a cap for positively holding said valve on its seat.

7. In an inflating device, the combination with a member having an air passageway and a valve seat, of a valve member, and means attached to one of said members and arranged to grip the other one of said members to hold said valve member upon said seat, and a cap for positively holding said valve on its seat.

8. In an inflating device, the combination with a member having an air passageway and a valve seat, a valve and carrier therefor, said carrier having gripping means arranged to slide in said passageway and coact with the wall of said passageway to hold said valve, and a cap for positively holding said valve on its seat.

9. A cap for tire valves or the like, comprising a stem adapted to engage the end of a valve casing to make a tight joint therewith, a cap member also adapted to engage the valve casing to hold the stem in place thereon, said stem passing through said cap member to the exterior and movable longitudinally therein whereby said stem can be lowered or raised to seal or unseal said valve casing while the cap engages the latter, and said cap member being adapted when in operative position to be adjusted on said casing to prevent the stem from raising, and supplemental means for holding said stem member in engagement with said casing when the cap member is out of operative position.

10. A cap for tire valves or the like, comprising a stem adapted to engage the end of a valve casing to make a tight joint therewith, a cap member also adapted to engage the valve casing to hold the stem in place thereon, said stem passing through said cap member to the exterior and movable longitudinally therein whereby said stem can be lowered or raised to seal or unseal said valve casing while the cap engages the latter, and said cap member being adapted when in operative position to be adjusted on said casing to prevent the stem from raising, and supplemental means for holding said stem member in engagement with said casing when the cap member is out of operative position, said means being resilient.

11. A cap for tire valves or the like, comprising a stem adapted to engage the end of a valve casing to make a tight joint therewith, a cap member also adapted to engage the valve casing to hold the stem in place thereon, said stem passing through said cap member to the exterior and movable longitudinally therein, whereby said stem can be lowered or raised to seal or unseal said valve casing while the cap engages the latter, and said cap member being adapted when in operative position to be adjusted on said casing to prevent the stem from raising, and supplemental means for holding said stem member in engagement with said casing when the cap member is out of operative position, said means comprising a spring portion on the stem member adapted to engage the valve casing.

12. The combination of a valve casing having a check valve and a cap adapted to screw on the end of said casing to close it, said cap comprising a stem member adapted to engage said check valve to open the latter and also adapted when said check valve is open to close the end of said casing, and a cap member adapted to engage said casing, said stem passing through said cap member and adapted to be reciprocated therein to open and close said check valve when said cap is in engagement, and means for holding said stem member in place to seal the valve casing when the check valve is open.

13. In a tire valve, a casing, a closure therefor adapted to move inwardly against said casing in the direction of the ingress of air, to seal the casing, and two means for holding said closure in its closing position, one of said means being capable of holding said closure in closing position when the other is not in its normal position for holding said closure in closing position.

14. In combination, a cap and a tire valve comprising a casing and valve parts capable of holding air independently of the presence of said cap, said cap having means for engaging said casing, and having a longitudinally movable casing-closing part thereon, means for holding said casing-closing part in a desired position in relation to said casing, said holding means being other than of said engaging means between the casing and cap.

15. In combination, a cap and a tire valve comprising a casing and valve parts capable of holding air independently of the presence of said cap, said cap having means for engaging said casing, and having a longitudinally movable casing-closing part thereon, means for holding said casing-closing part in a desired position in relation to said casing, said holding means being made operative by a substantially straight longitudinal movement of said casing-closing part and said holding means being other than said engaging means between the casing and cap.

16. In combination, a cap and a tire valve comprising a casing and valve parts capable of holding air independently of the presence of said cap, said cap having means for engaging said casing, and having a longitudinally movable casing-closing part thereon, frictional means for holding said casing-closing part in a desired position in relation to said casing, said holding means being other than said engaging means between the casing and cap.

17. In combination, a cap and a tire valve comprising a casing and valve parts capable of holding air independently of the presence of said cap, said cap having means for engaging said casing, and having a longitudinally movable casing-closing part thereon, means for holding said casing-closing part in a desired position in relation to said casing, said holding means being other than said engaging means between the casing and cap, and means between said casing-closing part and cap whereby said cap, when its engaging means are in fully engaged position, may hold said casing-closing part in closed position.

18. In combination, a cap and a tire valve comprising a casing and valve parts capable of holding air independently of the presence of said cap, said cap having means for engaging said casing, and having a longitudinally movable casing-closing part thereon, means for holding said casing-closing part in a desired position in relation to said casing, said holding means being made operative by a substantially straight longitudinal movement of said casing-closing part, and said holding means being other than said engaging means between the casing and cap, and means between said casing-closing part and cap whereby said cap, when its engaging means are in fully engaged position, may hold said casing-closing part in closed position.

19. In combination, a cap and a tire valve comprising a casing and valve parts capable of holding air independently of the presence of said cap, said cap having means for engaging said casing, and having a longitudinally-movable casing-closing part thereon, and means for limiting the longitudinal movement of said casing-closing part with respect to said cap, means for holding said casing-closing part in a desired position in relation to said casing, the limiting means of said casing-closing part permitting longitudinal movement to and from said holding position when said cap is not in its fully engaged position upon said casing, said cap being capable of being advanced upon its engaging means so as to hold said casing-closing part in approximately closing position, and being capable of being further advanced to force said casing-closing part into complete closing position with relation to the passage through said casing.

In testimony whereof I have affixed my signature, in presence of two witnesses.

FREDERIK NIELSEN.

Witnesses:
  WALTER P. ABELL,
  P. W. PEZZETH.